United States Patent [19]

Moulds, III

[11] Patent Number: 4,912,387
[45] Date of Patent: Mar. 27, 1990

[54] ADAPTIVE NOISE CANCELLING FOR MAGNETIC BEARING AUTO-BALANCING

[75] Inventor: Clinton W. Moulds, III, Millersville, Md.

[73] Assignee: Westinghouse Electric Corp., Pittsburgh, Pa.

[21] Appl. No.: 290,662

[22] Filed: Dec. 27, 1988

[51] Int. Cl.$^4$ .............................................. G05B 11/01
[52] U.S. Cl. .................................... 318/629; 318/605; 318/661; 318/648; 310/90.5; 358/165; 358/166; 358/167
[58] Field of Search ............... 318/629, 605, 661, 648; 310/90.5; 358/165–167

[56] References Cited

U.S. PATENT DOCUMENTS 4,121,143 10/1978 Habermann et al. ................ 318/629
4,673,982 6/1987 Tam et al. ............................. 358/167

OTHER PUBLICATIONS

"Adaptive-Noise Cancelling: Principles And Applications", Widrow, et al., Proceedings Of The IEEE, vol. 63, No. 12, Dec., 1975, pp. 1692–1716.

Primary Examiner—William M. Shoop, Jr.
Assistant Examiner—Saul M. Bergmann

[57] ABSTRACT

A separate adaptive noise canceller receiving a reference input of a rotor speed synchronization pulse is connected in the X and Y axis positional control loops of a magnetic bearing utilized to position a rotor suspended thereby. The output of the noise canceller is self-adjusting by the inclusion of an adaptive filter implementing a least mean square algorithm to force the gain of the control loop to zero at not only the fundamental of the rotational speed, but all harmonic frequencies thereof, thereby reducing the vibration and control system power dissipation of the magnetic bearing at the rotational fundamental as well as at the rotational harmonics.

11 Claims, 3 Drawing Sheets

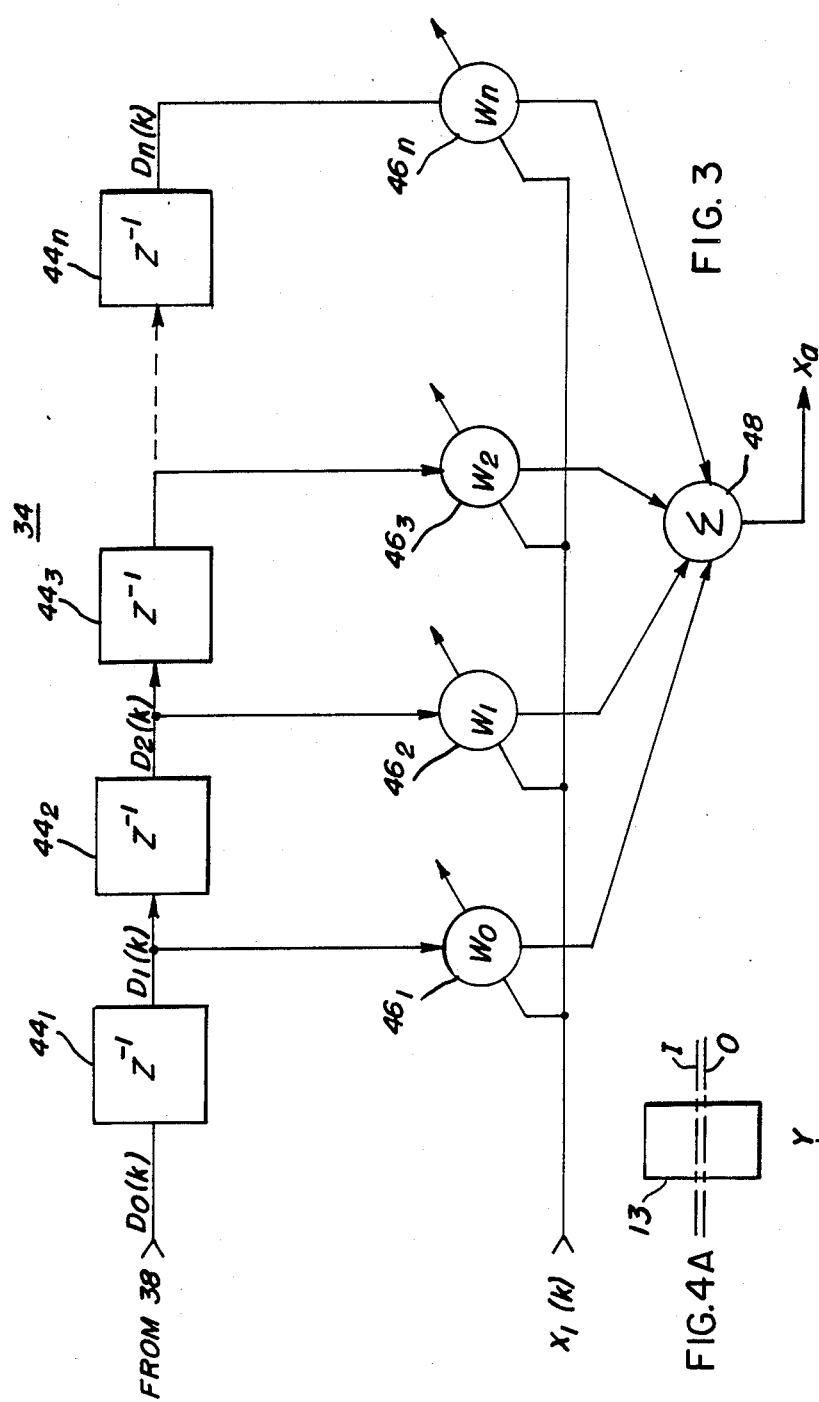
FIG. 3
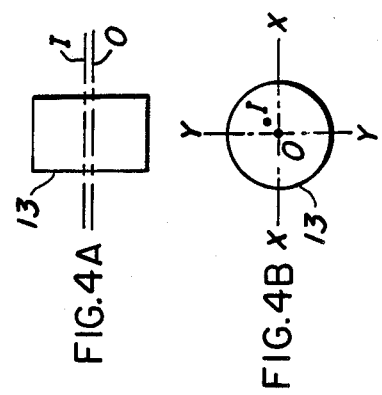
FIG. 4A
FIG. 4B

4,912,387

ADAPTIVE NOISE CANCELLING FOR MAGNETIC BEARING AUTO-BALANCING

BACKGROUND OF THE INVENTION

1. Field of the Invention

This invention relates generally to apparatus for balancing the rotor of a magnetic suspension system including a magnetic bearing and more particularly to apparatus for auto-balancing the rotor so that it spins about its principal axis of inertia rather than its central geometric axis when the two axes are not coincident.

2. Description of the Prior Art

In any suspension system for a rotating element such as the rotor of an electromagnetic machine, rotor balance poses a problem since it is virtually impossible to machine and mount a rotor in bearings so that the axis of inertia of the rotor exactly coincides with the axis of rotation defined by the bearings. The resulting non-coincidence results in undesired vibration and power loss. To alleviate this problem, great efforts have been expended to mechanically balance the rotor with high precision and great delicacy; however, it is virtually impossible to thereafter compensate for aging or thermal deformations without additional mechanical rebalancing requiring undesired shut-down of the equipment and furthermore such deformations cannot always be substantially compensated for all operating speeds.

With the development of magnetic bearings for the suspension of a rotor, the existence of any rotor unbalance results in the tendency of the rotor to rotate about the principal axis of inertia lying closest to a desired axis of rotation defined by the bearing rather than the axis of rotation. In the context of this application, the principal axis of inertia of the rotor is hereinafter referred to simply as the axis of inertia or inertial axis. Where such a condition exists, it can be compensated for by detecting the position of the rotor for any departure from its predetermined axial position from which energizing signals are generated and applied to the windings of the bearing to bring the axis of rotation back into proper alignment.

One known technique for compensating for synchronous disturbances of a rotor which is supported by a radial magnetic bearing is disclosed in U.S. Pat. No. 4,121,143, entitled, "Device For Compensating Synchronous Disturbances In The Magnetic Suspension Of A Rotor", issued to H. Habermann, et al. on Oct. 17, 1978. As disclosed in this patent, a two axis tracking notch filter implemented by a pair of lowpass integrators and two resolvers are connected in a two axis feedback loop which is coupled into the X and Y axis position control loops of the magnetic bearing control system. The tracking notch filter reduces the control loop gain at the rotor's frequency of rotation, thus allowing the rotor to spin about its inertial axis rather than its central geometric axis. This in turn reduces the reaction forces and vibration coupled to the stator and so reduces the power dissipated in the control system. An inherent limitation exists in such a system due to the fact that since resolvers multiply their respective inputs by the factors sin $\omega t$ and cos $\omega t$, where $\omega$ is proportional to rotational speed of the rotor and generate therefrom a pair of output signals utilized in the feedback loop, the loop gain reduction can only occur at the fundamental rotational frequency $\omega$. Accordingly, any imbalances and asymmetries which exhibit higher harmonics of the rotational fundamental frequency, will still transmit vibrations forces to the stator and thus cause the control system to necessarily dissipate power in trying to oppose these forces.

It is a primary object of the present invention, therefore, to provide an improvement in the control of a magnetic suspension system for a rotor which is supported by a radial electromagnetic bearing.

It is another object of the invention to provide an improvement in the auto-balancing a rotor in a magnetic bearing system.

And yet another object of the invention is to provide an improvement in a system for auto-balancing the magnetically suspended rotor so as to allow the rotor to spin about its inertial axis rather than its geometric axis.

And still a further object of the invention is to provide an improvement in an auto-balancing magnetic bearing system which operates to eliminate external vibration and reduce power consumption.

SUMMARY OF THE INVENTION

Briefly, the forgoing and other objects are achieved by the inclusion of an adaptive noise canceller in the X and Y axis positional control loops of a magnetic bearing utilized to position a rotor and wherein each of the adaptive noise cancellers receives a rotor synchronization pulse generated by a device which senses speed of rotation of the rotor. The output of the noise canceller is self-adjusting by the inclusion of an adaptive filter implementing a least mean square algorithm to force the gain of the control loop to zero at not only the fundamental of the rotational speed, but all harmonic frequencies thereof.

BRIEF DESCRIPTION OF THE DRAWINGS

The invention may be better understood and further advantages and uses thereof will become readily apparent when considered in view of the following detailed description of the preferred embodiment when taken in conjunction with the accompanying drawing in which:

FIG. 3 is an electrical block diagram illustrative of one of the adaptive filters shown in FIG. 2.

FIGS. 4A and 4B are schematic diagrams of a rotor according to the subject invention illustrating the offset between the rotor's central geometric axis and the inertial axis thereof.

DESCRIPTION OF THE PREFERRED EMBODIMENT

Figure 1:
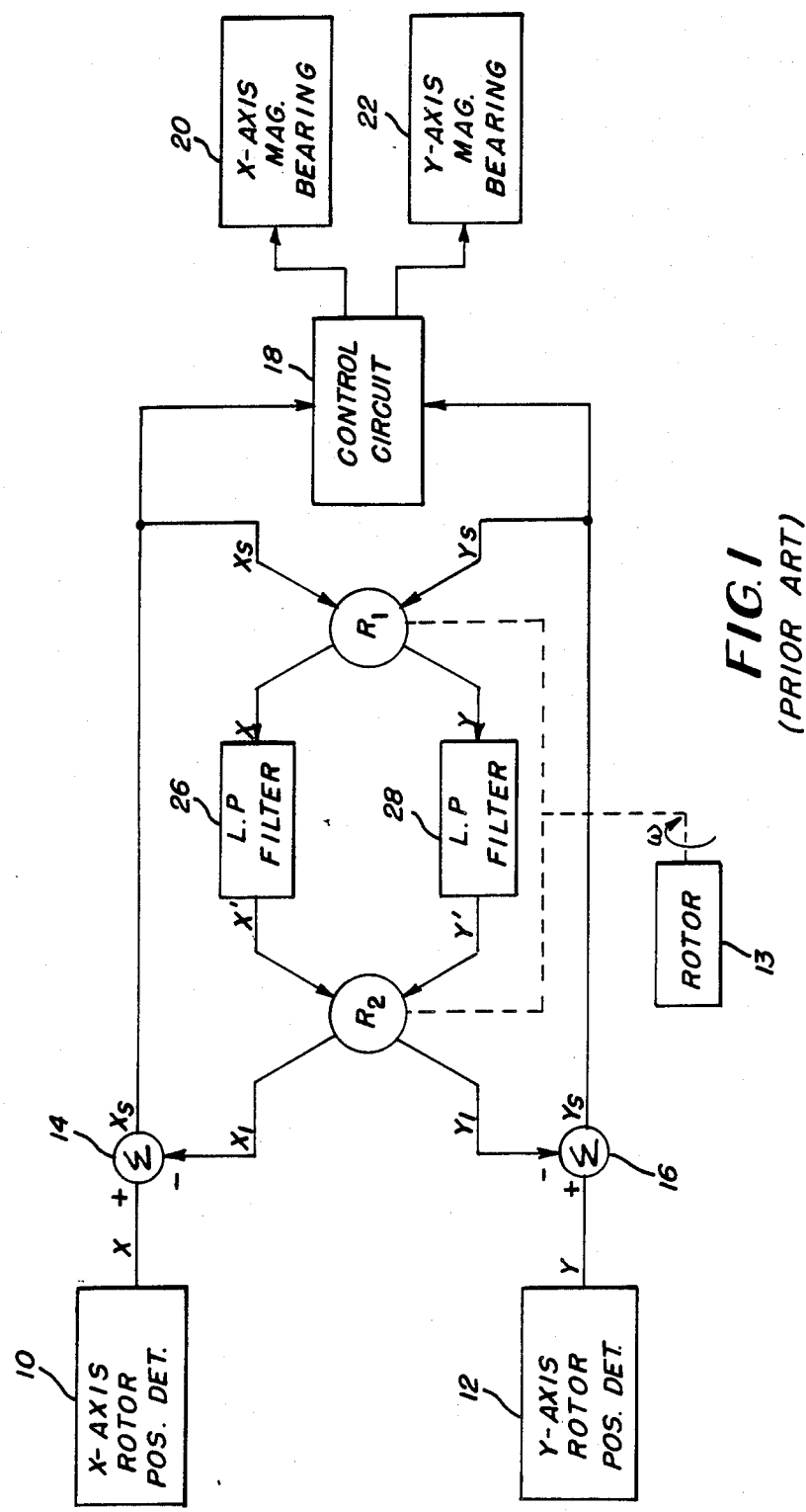
FIG. 1 is an electrical block diagram illustrative of a known prior art circuit for implementing auto-balancing of a rotor.

Referring now to the drawings, reference will be made first to FIG. 1 wherein there is shown a circuit of the type disclosed in the above-referenced prior art patent U.S. Pat. No. 4,121,143 for compensating synchronous disturbances in the magnetic suspension system of a rotor which is supported by a radial magnetic bearing.

As shown in FIG. 1, reference numerals 10 and 12 denote position detectors for a magnetically suspended rotor 13 (FIGS. 4A and 4B) along mutually orthogonal horizontal (X) and vertical (Y) axes. The X and Y axis position output signals from the detectors 10 and 12 are applied to respective like inputs to a pair of signal adders 14 and 16 which additionally receive inputs from the $X_1$ and $Y_1$ outputs of the second resolver $R_2$ of a pair of like signal resolvers $R_1$ and $R_2$. Resolvers are devices well known in the art for converting a rotating vector signal, for example, into horizontal and vertical component signals. The output of the adders 14 and 16 which comprises the difference signals $X_s$ and $Y_s$ are applied to the inputs of the first resolver $R_1$ and as well as to the input of a control circuit 18. The control circuit operates to energize X and Y axes magnetic bearing assemblies 20 and 22 which exert attractive forces on the rotor 13.

The rotor 13 is mechanically coupled to and rotates both resolvers $R_1$ and $R_2$ in unison at an angular frequency $\omega$, where $\omega = 2\pi f$ and where f is equal to rotational frequency. The X and Y signal outputs from the resolver $R_1$ are respectively fed to a pair of lowpass filters to provide outputs of $X_1$ and $Y_1$ which are applied to the two inputs of the second resolver $R_2$. In operation, the resolver $R_1$ generates X and Y output signals according to the expression:

$$X = X_s \cos \omega t + Y_s \sin \omega t$$

$$Y = -X_s \sin \omega t + Y_s \cos \omega t$$

Since the X and Y axes are perpendicular to the axis of rotation of the rotor, any unbalance generates stray error signals having a frequency equal to the speed of rotation of the motor. The conversion effected by the resolver $R_1$ effectively makes the unbalance fixed relative to the rotor.

Next the filtered X and Y signals from the resolver $R_1$ are applied to the second resolver $R_2$ which effects a conversion reverse to that of the resolver $R_1$ and which supplies signals to the adders 14 and 16 of $X_1$ and $Y_1$ according to the expressions:

$$X_1 = -X' \cos \omega t + Y' \sin \omega t$$

$$Y_1 = -X' \sin \omega t + Y' \cos \omega t.$$

Thus an effect is achieved which is as if a superimposition is made on the signals X and Y of compensation signals representing a fictitious unbalance balancing the real unbalance.

While the circuitry shown in FIG. 1 illustrates the resolvers $R_1$ and $R_2$ as being implemented as rotary conversion devices which are mechanically coupled to the rotor 24 and driven thereby at the speed $\omega$, it should be noted that when desirable the resolvers can be implemented by electrical conversion circuits which receive a third input of an electrical signal $\omega t$ which is generated, for example, by an electrical tachometer coupled to the shaft of the rotor. Such a teaching appears in U.S. Pat. No. 4,121,143. In either case, the combination of the two resolvers $R_1$ and $R_2$ as well as the integrating filters 26 and 28 implement a two axis tracking notch filter coupled into the X an Y magnetic bearing control loops and operates to reduce the control loop gain at the frequency of rotation $\omega$ of the rotor 24, allowing the rotor to spin about its inertial axis I (FIG. 4A) rather than its central axis O. For a more comprehensive treatment of the type of auto-balancing achieved in FIG. 1, reference can be made to the aforementioned U.S. Pat. No. 4,121,143.

Figure 2:
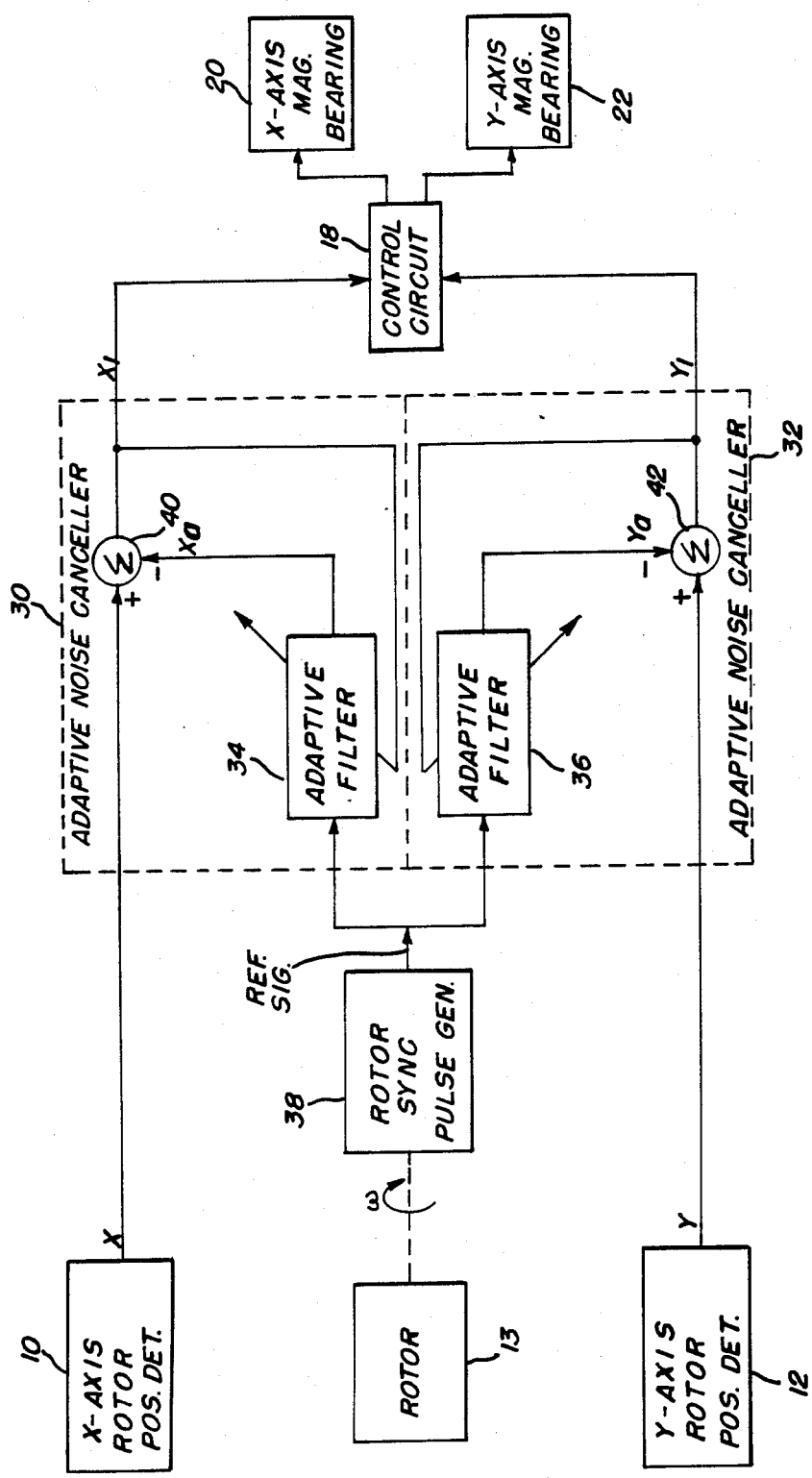
FIG. 2 is an electrical block diagram illustrative of the preferred embodiment of the invention.

This now leads to a consideration of the preferred embodiment of the present invention which is disclosed in FIG. 2 and wherein the tracking notch filter implemented by the pair of resolvers $R_1$ and $R_2$ and the lowpass filters 26 and 28 of FIG. 1 are now replaced by a pair of adaptive noise canceller circuits 30 and 32, implemented in either the time domain or the frequency domain and which automatically adjusts its operating characteristic to minimize, as far as allowed by its input, the amplitude of the signals $X_1$ and $Y_1$ applied to the control circuit 18. The concept of adaptive noise cancelling and its means of implementation are known and disclosed, for example, in a publication entitled, "Adaptive Noise Cancelling: Principles And Applications" by B. Widrow, et al. which appeared in the *Proceedings of the IEEE*, Vol. 63, No. 12, December, 1975, pp. 1692–1716 and is intended to be specifically incorporated herein by reference.

An adaptive filter differs from a fixed filter in that it automatically adjusts its own impulse response. This is accomplished through an algorithm that responds to an error signal dependent, among other things, on the filter's own output. With the proper algorithm, the filter can operate under changing conditions and can readjust itself continuously, depending upon the nature of the application, to minimize an error signal output.

In a noise cancelling system, for example, the objective is to produce, for a given noise reference input signal a system whose output is a best fit in the least square sense to the input signal. This objective is accomplished by feeding the output signal back to the adaptive filter as an error signal and adjusting the filter through a least mean square (LMS) adaptive algorithm such as taught in the Widrow, et al. publication, to minimize total system output power. In an adaptive noise cancelling system therefor the system output serves as the error signal input for the adaptive process.

In the embodiment of the invention shown in FIG. 2, the adaptive noise cancellers 30 and 32 are comprised of a pair of adaptive filters 34 and 36, each of which receive two inputs, namely a common reference signal comprising a rotor synchronization pulse from the pulse generator 38 and the respective difference signal output from a pair of signal adders 40 and 42. One input to the adders 40 and 42 comprises the primary signals X and Y from the X and Y axis rotor position detectors 10 and 12, while the second or subtractive input to the adders comprise the respective signal outputs $X_a$ and $Y_a$ from the adaptive filters 34 and 36.

The pulse generator 38 comprises a magnetic, optical or capacitive pickup coupled, for example, to the shaft of the rotor 13 and consists of a discrete time pulse train or a continuous time impulse train with a frequency spectrum which contains the rotational fundamental frequency of the rotor and all the rotational harmonics.

The adaptive filters 34 and 36 of the noise cancellers 30 and 32 will adjust themselves to force the amplitude of the signal $X_1$ or $Y_1$, at the fundamental and all harmonics of the rotational frequency, to zero by driving the control loop gain to zero. Auto-balancing, with the resulting reduction in vibration and power dissipation will therefore occur not only at the fundamental but at all the harmonics thereof rather than only at the fundamental as disclosed in the above-referenced prior art.

An illustrative example of one of the adaptive filters, for example the filter 34, is shown in FIG. 3; however, it should be noted that the adaptive filter 36 comprises an identical configuration. The adaptive filter 34 as shown is implemented as a tapped delay line filter comprised of n delay line sections $44_1$, $44_2$, $44_3$ ... $44_n$. The first section $44_1$ receives the reference signal generated by the rotor sync pulse generator 38 shown in FIG. 2. The output of each of the filter sections $44_1 \ldots 44_n$ are respectively weighted by adjustable weighting coefficients or multiplying factors $W_0, W_1 \ldots W_n$ shown by reference numerals $46_1, 46_2, 46_3 \ldots 46_n$ in response to the signal $X_1$ which is the output of the adder 40 shown in FIG. 2. The weighted outputs of the delay line are summed in a signal adder 48 and comprises the signal $X_a$ applied to the subtractive input of the signal adder 40. The weighting coefficients $W_O$ through $W_N$ are adaptively updated according to the following vector difference equation:

$$\overline{W}(k+1) = \overline{W}(k) + \mu \cdot X_1(k) \cdot \overline{D}(k)$$

$$\text{where } \overline{W}(k) = \begin{pmatrix} W_o(k) \\ \cdot \\ \cdot \\ W_n(k) \end{pmatrix}$$

and $$\overline{D}(k) + \begin{pmatrix} D_o(k) \\ \cdot \\ \cdot \\ D_n(k) \end{pmatrix} \text{ are vectors,}$$

and where $X_1(k)$ is the scalar adaptive input, and $\mu$ is a scalar factor controlling the adaptation speed of the filter. The configuration of FIG. 3 thus discloses one means to implement a LMS adaptive filter; however, it should be known that those skilled in the art can readily resort to other means for accomplishing the same result.

Having thus shown and described what is at present considered to be the preferred embodiment of the invention, it should be noted that the same has been made by way of illustration and no limitation. Accordingly, all alterations, modifications and changes coming within the spirit and scope of the invention are herein meant to be included.

What is claimed is:

1. A servo control loop of predetermined gain for auto-balancing a rotor supported by a magnetic bearing system including a pair of magnetic bearings which when energized exert attractive forces on the rotor along first and second mutually perpendicular axes, comprising:
   first and second means for detecting radial displacement of the rotor away from its rotational axis along said first and second axes and generating respective first and second radial positional error signals;
   means for generating a signal indicative of the rotational speed of the rotor;
   a control circuit for selectively energizing said pair of magnetic bearings in response to first and second output signals; and
   first and second adaptive filter means, implementing a least mean square algorithm, coupled between said first and second detecting means and said control circuit and being responsive to respective said first and second radial positional error signals and said signal indicative of rotational speed to generate said first and second output signals;
   whereby said gain of the servo control loop is forced to zero at not only the fundamental frequency of the rotational speed, but all harmonic frequencies thereof, thereby causing the rotor to spin about its principal inertial axis closest to an axis of rotation coincident with its central longitudinal geometric axis as opposed to said geometric axis.

2. The servo control loop as defined by claim 1 wherein said first and second adaptive filter means each include a pair of inputs and an output, and additionally including:
   a first signal adder having first and second inputs and an output, and wherein said first input thereof is coupled to said first radial positional error signal, said second input thereof is coupled to the output of said first adaptive filter means and said output is coupled to said control circuit and to one of said pair of inputs of said first adaptive filter means, and
   a second signal adder having first and second inputs and an output, and wherein said first input thereof is coupled to said second radial positional error signal, said second input thereof is coupled to the output of said second adaptive filter means and said output is coupled to said control circuit and to one of said pair of inputs of said second adaptive filter means.

3. The servo control loop as defined by claim 2 wherein the other of said pair of inputs of said first and second adaptive filter means is coupled to said signal indicative of rotational speed of the rotor.

4. The servo control loop as defined by claim 2 wherein said means for generating a signal indicative of the rotational speed of the rotor comprises a pulse generator and wherein said signal indicative of rotational speed comprises a pulse signal.

5. The servo control loop as defined by claim 2 wherein said output of said first and said second signal adders comprises a difference signal output of the signals connected to said first and second inputs.

6. In a positional servo control loop having a predetermined gain for auto-balancing a rotor supported by a magnetic bearing system including a pair of magnetic bearings which when energized exert attractive forces on the rotor along first and second mutually perpendicular axes normal to the rotational axis of the motor,
   first and second position detectors for detecting radial displacement of the rotor away from said rotational axis along said first and second axes and generating respective first and second radial positional error signals,
   means coupled to said rotor for generating a signal indicative of the rotational speed thereof,
   a closed loop control circuit for selectively energizing said pair of magnetic bearings in response to first and second output signals, and
   first and second adaptive noise canceller circuits coupled between said first and second detecting means and said control circuit and being responsive to said first and second radial positional error signals and said signal indicative of rotational speed to generate said first and second output signals,
   whereby said gain of the servo control loop is forced to zero at not only the fundamental frequency of the rotational speed of the rotor, but all harmonic frequencies thereof, thereby causing the rotor to spin about its principal inertial axis closest to an axis of rotational coincident with its central geometric axis as opposed to said geometric axis.

7. The control loop as defined by claim 6 wherein each said adaptive noise canceller circuit includes:

an adaptive filter including a reference signal input, a feedback signal input and an output, and a signal adder having two inputs and an output, wherein the feedback input of the adaptive filter is coupled to the output of the adder, the reference signal input of the adaptive filter is coupled to said signal indicative of rotational speed of the motor and the output of the adaptive filter is coupled to one input of said adder, and the other input of said adder is coupled to one of said first and second radial positional error signals.

8. The control loop as defined by claim 7 wherein the adaptive filter implements a least mean square adaptive algorithm.

9. The control loop as defined by claim 7 wherein the adaptive filter operates to generate an output signal comprising the least mean square of the signal coupled to the feedback input thereof.

10. The control loop as defined by claim 7 wherein said adaptive filter comprises, a tapped delay line coupled to said reference signal input and generating a plurality of tap output signals, means responsive to one of the difference signal outputs coupled to said feedback signal input for adaptively weighting said output signals to generate a plurality of weighted output signals, and a signal adder for summing said weighted output signals to generate a composite output signal coupled to said filter output.

11. A servo control loop of predetermined gain for autobalancing a rotor supported by a magnetic bearing system including a pair of magnetic bearings which when energized exert attractive forces on the rotor along first and second mutually perpendicular axes, comprising:

first and second means for detecting radial displacement of the rotor away from its rotational axis along said first and second axes and generating respective first and second radial positional error signal;

means for generating a signal indicative of the rotational speed of the rotor;

a control circuit for selectively energizing said pair of magnetic bearings in response to first and second output signals; and first and second adaptive filter means, implementing a least mean square adaptive algorithm, coupled between said first and second detecting means and said control circuit and being responsive to respective said first and second radial positional error signals and said signal indicative of rotational speed to generate said first and second output signals, said first and second adaptive filter means each including a pair of inputs and an output, and further comprising, a first signal adder having first and second inputs and an output, and wherein said first input thereof is coupled to said first radial positional error signal, said second input thereof is coupled to the output of said first adaptive filter means and said output is coupled to said control circuit and to one of said pair of inputs of said input adaptive filter means, and a second signal adder having first and second inputs and an output, and wherein said first input thereof is coupled to said second radial positional error signal, said second input thereof is coupled to the output of said second adaptive filter means and said output is coupled to said control circuit and to one of said pair of inputs of said second adaptive filter means;

whereby said gain of the servo control loop is forced to zero at not only the fundamental frequency of the rotational speed, but all harmonic frequencies thereof, thereby causing the rotor to spin about its principal inertial axis closest to an axis of rotation coincident with its central longitudinal geometric axis as opposed to said geometric axis.

* * * * *